US012208954B2

(12) United States Patent
Wiedemann

(10) Patent No.: US 12,208,954 B2
(45) Date of Patent: Jan. 28, 2025

(54) COAXIAL CARTRIDGE HAVING AN INTEGRATED REINFORCEMENT FOR DISPENSING A FLOWABLE MULTI-COMPONENT COMPOSITION WITHOUT RESTORING FORCE

(71) Applicant: Hilti Aktiengesellschaft, Schaan (LI)

(72) Inventor: Michael Wiedemann, Koenigsbrunn (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/933,282

(22) Filed: Sep. 19, 2022

(65) Prior Publication Data

US 2023/0087866 A1 Mar. 23, 2023

(30) Foreign Application Priority Data

Sep. 21, 2021 (EP) .................................... 21197871

(51) Int. Cl.
*B65D 81/32* (2006.01)
*B05C 17/005* (2006.01)

(52) U.S. Cl.
CPC ...... *B65D 81/325* (2013.01); *B05C 17/00559* (2013.01)

(58) Field of Classification Search
CPC ........................ B65D 81/325; B05C 17/00559
USPC .................................................. 222/326, 325
See application file for complete search history.

(56) References Cited

U.S. PATENT DOCUMENTS

| | | | | |
|---|---|---|---|---|
| 3,919,026 A * | 11/1975 | Mizutani | B29C 53/785 156/173 |
| 4,262,704 A * | 4/1981 | Grawey | F16L 11/24 156/149 |
| 4,338,925 A | 7/1982 | Miller | |
| 4,340,154 A * | 7/1982 | VanManen | B65D 35/242 222/88 |

(Continued)

FOREIGN PATENT DOCUMENTS

| | | |
|---|---|---|
| AU | 7997682 | 8/1982 |
| DE | 3201630 | 10/1982 |

(Continued)

*Primary Examiner* — Paul R Durand
*Assistant Examiner* — Michael J. Melaragno
(74) *Attorney, Agent, or Firm* — Grüneberg and Myers PLLC

(57) ABSTRACT

A coaxial cartridge for storing and discharging a flowable multi-component composition, contains a hollow-cylindrical inner wall and a hollow-cylindrical outer wall arranged coaxially around the inner wall. The coaxial cartridge has an inner chamber for a first component, which is delimited radially by the inner wall, and an outer chamber for a second component, which is arranged radially between the inner wall and the outer wall. The coaxial cartridge also contains a cartridge front wall, which firmly closes the inner and the outer chamber on one end face of the cartridge and has one discharge opening per chamber; an inner and an outer piston which each close the relevant chamber at the rear and are axially movable; and an integrated reinforcement embedded inside the outer wall or fastened to its surface and having a plurality of rings or spiral turns, made of a material that is stable against tensile stresses.

22 Claims, 3 Drawing Sheets

(56) References Cited

U.S. PATENT DOCUMENTS

| | | | | | |
|---|---|---|---|---|---|
| 4,461,324 | A * | 7/1984 | Schneider | F16L 57/06 | 138/138 |
| 4,676,657 | A * | 6/1987 | Botrie | B01F 25/433 | 366/162.3 |
| 4,690,306 | A * | 9/1987 | Staheli | B05C 17/0123 | 222/137 |
| 5,027,981 | A * | 7/1991 | Magister | B65D 81/325 | 222/137 |
| 5,139,171 | A * | 8/1992 | Mader | B05C 17/00559 | 222/326 |
| 5,301,842 | A * | 4/1994 | Ritter | B65D 81/325 | 222/548 |
| 5,566,860 | A * | 10/1996 | Schiltz | B05C 17/00513 | 222/137 |
| 5,622,288 | A * | 4/1997 | Boring | B65D 83/0005 | 222/386 |
| 5,702,373 | A * | 12/1997 | Samson | A61M 25/005 | 604/526 |
| 6,305,428 | B1 * | 10/2001 | Nakamura | A47L 9/24 | 138/133 |
| 2002/0008123 | A1 | 1/2002 | Nakayoshi et al. | | |
| 2005/0049558 | A1 | 3/2005 | Knee et al. | | |
| 2007/0246482 | A1 * | 10/2007 | Goldberg | B05C 17/015 | 222/129 |
| 2008/0144426 | A1 * | 6/2008 | Janssen | B01F 35/522 | 366/162.3 |
| 2011/0214772 | A1 * | 9/2011 | Lee | F16L 11/112 | 138/129 |
| 2012/0104030 | A1 * | 5/2012 | Springhorn | B05C 17/00553 | 222/137 |
| 2012/0248058 | A1 * | 10/2012 | Habibi-Naini | B65D 1/0238 | 215/45 |
| 2013/0015205 | A1 * | 1/2013 | Hiemer | B65D 83/0005 | 222/326 |
| 2017/0120270 | A1 * | 5/2017 | Warren | H05B 3/40 | |
| 2023/0087866 | A1 * | 3/2023 | Wiedemann | B65D 81/325 | |
| 2023/0089731 | A1 * | 3/2023 | Wiedemann | B05C 17/00596 | |

FOREIGN PATENT DOCUMENTS

| | | | | | |
|---|---|---|---|---|---|
| EP | 4151322 | A1 * | 3/2023 | B05C 17/00559 |
| GB | 2092236 | | 8/1982 | |
| GB | 2244938 | A * | 12/1991 | B01D 24/00 |
| KR | 10-2014-0024716 | | 3/2014 | |
| WO | WO-9403392 | A1 * | 2/1994 | A61M 5/19 |
| WO | WO-9505984 | A2 * | 3/1995 | B05C 17/00513 |
| WO | WO-0119700 | A1 * | 3/2001 | B05C 17/00553 |
| WO | WO-2006015596 | A1 * | 2/2006 | B05C 17/00553 |
| WO | WO-2009067963 | A1 * | 6/2009 | B65D 81/325 |
| WO | WO-2009109661 | A1 * | 9/2009 | B65D 81/3227 |
| WO | WO-2013056872 | A1 * | 4/2013 | B05C 17/00553 |
| WO | WO-2016036620 | A1 * | 3/2016 | B65B 3/12 |
| WO | WO-2018080525 | A1 * | 5/2018 | |

* cited by examiner

COAXIAL CARTRIDGE HAVING AN INTEGRATED REINFORCEMENT FOR DISPENSING A FLOWABLE MULTI-COMPONENT COMPOSITION WITHOUT RESTORING FORCE

CROSS-REFERENCE TO RELATED APPLICATIONS

This application claims priority to European Application No. 21197871.3, filed on Sep. 21, 2021, the content of which is hereby incorporated by reference in its entirety.

BACKGROUND OF THE INVENTION

Field of the Invention

The invention relates to a coaxial cartridge which is designed to receive and store a first and a second component of a flowable multi-component composition in separate coaxial chambers and to dispense this composition from the cartridge. Even if the explanation of the invention herein usually only mentions these two chambers for two components, further (partial) chambers for other components of the multi-component composition can always be provided inside the cartridge.

Description of Related Art

Various cartridge designs are known in the prior art for receiving at least two components of flowable compositions in separate chambers, which can be discharged by means of a dispensing device. With regard to the arrangement of the chambers, a distinction is made between coaxial cartridges and cartridges or film packages with individual cartridges or film pouches arranged next to one another for the various components of a multi-component composition. The multi-component composition can be, for example, a sealing or fastening composition such as mortar, adhesive and much more.

In order to ensure a high, constant mixing quality of the two composition components to be discharged, suitable support structures for the cartridges, into which the cartridges for the dispensing process are inserted, are to be used in most cases. During the dispensing process, these support structures absorb the pressures of the cartridges and prevent elastic expansion of the cartridges, which are mostly made of plastics material and would therefore yield to a high pressure during the dispensing process without the support structure.

Thick-walled coaxial cartridges made of plastics material usually show elastic expansion only in the outer wall of the cartridge during the dispensing process due to an almost equally high pressure in both chambers and an overpressure compared to the atmospheric pressure prevailing outside the cartridge. This can lead to undesired pumping behavior of the cartridge, which leads to mixing problems and a corresponding lack of curing behavior of the composition:

When the outer wall of a thick-walled plastics cartridge elastically expands radially during the dispensing process, restoring forces arise therein. In the event that the dispensing process is interrupted, for example when moving to the next borehole, when multiple boreholes are to be filled with the contents of the cartridge in a row, these forces can lead to uneven pumping behavior in the cartridge, which is caused by the mentioned elastic restoring forces. The pressure in the outer chamber of the cartridge is relieved after an interrupted dispensing process either by the components contained therein flowing out through the cartridge outlet or by relieving the pressure of the outer piston arranged in this chamber. This creates a piston offset in relation to the inner chamber, which leads to corresponding mixing problems during the subsequent dispensing process.

A suitable support structure that can prevent elastic deformation of the outer wall during the dispensing process should therefore be used as a remedy. This support structure would have to be as close as possible to the cartridge in order to limit the possible pump volume to a minimum. During pumping behavior, the outer piston can move back between the support structure and the outer wall of the cartridge only according to the volume of any annular gap, because the outer wall of the cartridge could only elastically expand within this annular gap during the dispensing process. It is also important to ensure that the support structure is sufficiently rigid in order to avoid pumping by the deformation of the support structure itself.

Identical diameters (i.e. the inner diameter of the support structure is the same as the outer diameter of the cartridge) therefore offer the greatest possible protection against disruptive pumping behavior and the associated mixing disruption of the dispensed composition. However, identical diameters prevent the cartridge from being easily inserted into/removed from the support structure. This in turn requires a slightly larger inner diameter of the support structure compared to the outer diameter of the cartridge, i.e. the above-mentioned annular gap between the cartridge and the support structure, which promotes the disruptive pumping behavior. Pumping is a major challenge, especially with large-volume cartridges and packaging.

SUMMARY OF THE INVENTION

It is therefore the object of the present invention to provide a coaxial cartridge for storing a flowable multi-component composition and for dispensing this composition from the cartridge, and optionally a system consisting of a cartridge in combination with a support structure into which said composition is placed for the dispensing process, with which system the described disruptive pumping behavior of the cartridge, which is based on elastic restoring forces, can be reduced or even entirely prevented.

This object is achieved by a coaxial cartridge according to the description and by a corresponding system according to the description. Further embodiments and designs are also specified in the description below. All of the further features and effects mentioned in embodiments and the description for the cartridge also apply accordingly to the system, and vice versa.

The invention also includes the following embodiments:

1. Coaxial cartridge (2) which is designed to store and discharge a flowable multi-component composition, comprising:
   - a hollow-cylindrical inner wall (4) and a hollow-cylindrical outer wall (5) arranged coaxially around said inner wall, such that the cartridge (2) has an inner chamber, which is delimited radially by the inner wall (4), for receiving a first component (6) and an outer chamber (7), which is arranged radially between the inner wall (4) and the outer wall (5), for receiving a second component of the multi-component composition;
   - a cartridge front wall (8) which firmly closes the inner and the outer chamber (6, 7) on one end face of the cartridge (2) and has one discharge opening per chamber;

an inner piston (10) which closes the inner chamber (6) at the rear and is axially movable therein, and an outer piston (11) which closes the outer chamber (7) at the rear and is axially movable therein; and an integrated reinforcement (14) embedded inside the outer wall (5) or fastened to its surface and having a plurality of rings that are overlapping or closed in the peripheral direction of the outer wall (5), or turns which form a spiral, each made of a material that is stable against tensile stresses.

2. Coaxial cartridge (2) according to embodiment 1, wherein:

the material of the rings or the spiral turns and the number and distribution thereof along the outer wall (5) are such that, when the composition is dispensed from the cartridge (2) by axial displacement of the inner and of the outer piston (10, 11), the shape and dimensions of the outer wall (5) remain unchanged.

3. Coaxial cartridge (2) according to either embodiment 1 or embodiment 2, wherein:

the plurality of rings or spiral turns are distributed substantially evenly over an entire axial length of the outer wall (5).

4. Coaxial cartridge (2) according to any of the preceding embodiments, wherein:

the reinforcement (14) has a woven fabric made of the mentioned material that is stable against tensile stresses, wherein the plurality of rings or spiral turns are a component of this woven fabric.

5. Coaxial cartridge (2) according to any of the preceding embodiments, wherein at least the outer wall (5) of the cartridge (2) is produced by injection molding or another casting process; and the reinforcement (14) is embedded inside the outer wall (5) by being cast therein.

6. Coaxial cartridge (2) according to embodiment 5, wherein the reinforcement (14) has the plurality of rings that are closed in the peripheral direction of the outer wall (5) or spiral turns merging into one another without interruption.

7. Coaxial cartridge (2) according to any of embodiments 1 to 4, wherein the reinforcement (14) is formed in a layer or film which is fastened to the inside or outside of the outer wall (5) of the cartridge (2) with an overlap in the peripheral direction; and the plurality of rings each overlap in the peripheral direction by extending in the peripheral direction into overlapping portions of the mentioned layer or film that are fastened to one another, and thereby have overlapping ends.

8. Coaxial cartridge (2) according to embodiment 7, wherein the mentioned layer or film is glued to the outside of the outer wall (5) of the cartridge (2) and is designed as a label (15) which, in addition to the reinforcement (14), bears predetermined identification elements for identifying or labeling the cartridge (2).

9. Coaxial cartridge (2) according to any of the preceding embodiments, wherein the mentioned material of the rings or the spiral turns is or comprises aramid, glass fiber or carbon fiber.

10. System (1) for storing and discharging a flowable multi-component composition, comprising:

a coaxial cartridge (2) according to any of the preceding embodiments; and a support structure (3) having a receptacle (13) which is at least partially cylindrical on the inside, the shape and size of which receptacle is dimensioned for inserting and holding the cartridge (2) in order to dispense the multi-component composition therefrom, wherein an inner diameter of the cylindrical receptacle (13) of the support structure (3) is greater than an outer diameter of the cartridge (2) by a predetermined annular gap which is twice as wide, wherein this annular gap (12) between the cartridge (2) and the cylindrical receptacle (13) of the support structure (3) is preferably just wide enough to allow the cartridge (2) to be inserted smoothly into the receptacle (13) of the support structure (3).

DETAILED DESCRIPTION OF THE INVENTION

According to a first aspect, a coaxial cartridge is provided for storing a flowable multi-component composition and for discharging (by dispensing) this composition from the cartridge. In this case, the cartridge can—but does not necessarily have to—be designed so as to be inserted into a suitable support structure for the dispensing process. The multi-component composition comprises at least a first component and a second component, which are stored separately from one another in the cartridge and are only intended to be mixed with one another when they are discharged from the cartridge. This can in particular be a sealing or fastening composition such as mortar, adhesive and the like.

The cartridge comprises a hollow-cylindrical inner wall and a hollow-cylindrical outer wall arranged coaxially (i.e. with the same cylinder axis) around said inner wall, such that the cartridge has an inner chamber, which is delimited radially by the inner wall, for receiving the first component of the multi-component composition and an outer chamber, which is arranged radially between the inner wall and the outer wall, for receiving the second component of the multi-component composition. Even if the following explanation of the invention usually only mentions these two chambers for two components, further (partial) chambers for other components of the multi-component composition can always be provided inside the cartridge, which are to be discharged from the cartridge in the same dispensing process and mixed with the first and second components.

On one of its two (in the axial direction) opposite end faces, the cartridge has a cartridge front wall, which delimits the inner chamber and the outer chamber in the axial direction and has a discharge opening for the first component in the region of the inner chamber and a discharge opening for the second component in the region of the outer chamber. The cartridge front wall can in particular be rigidly connected to the inner and the outer wall of the cartridge. For this purpose, said front wall can be integral with the inner and/or the outer wall, for example, or it can be fastened thereto in the form of a separately produced cartridge cover.

Furthermore, the cartridge comprises an inner piston which closes the inner chamber at the rear (i.e. toward the other end face of the cartridge) and is axially movable therein, and an outer piston which also closes the outer chamber at the rear and is axially movable therein. The inner wall and/or the outer wall of the cartridge can be designed in particular to be dimensionally stable, for example thick-walled, such that it/they radially support(s) the inner piston and the outer piston and thereby guide(s) them during their axial movement.

The cartridge also comprises an integrated reinforcement embedded inside the outer wall or fastened to its surface and having a plurality of rings that are at least overlapping or closed in the peripheral direction of the outer wall, or a plurality of turns which form a spiral around the cylinder axis. These rings or spiral turns are made of a material that is stable against tensile stresses, such that the reinforcement can absorb tensile loads in the peripheral direction of the outer wall and thus prevent radial expansion or an increase in diameter of the outer wall during a dispensing process.

One concept of the present invention is to provide a coaxial cartridge that has a slightly smaller diameter than a support structure used for the dispensing process in order to facilitate inserting the cartridge into the support structure. In this case, the cartridge has an integrated reinforcement by means of which a pumping behavior of the cartridge in the support structure, which behavior is based on elastic restoring forces, can be significantly reduced or even eliminated. The reinforcement can be injected into the outer wall of the cartridge or glued around the cartridge like a label. Another concept of the invention is that of completely dispensing with a support structure surrounding the cartridge by means of an integrated reinforcement of the type presented here.

According to one embodiment, the cartridge and its integrated reinforcement—i.e. the mentioned material of the rings or the spiral turns and the number and distribution thereof along the outer wall of the cartridge—are selected and designed in such a way that, when the composition is dispensed from the cartridge by axial displacement of the inner and the outer piston (referred to herein as the dispensing process), the shape and dimensions of the outer wall remain largely unchanged. In other words, in this embodiment the integrated reinforcement of the cartridge is designed to prevent any deformation (i.e. including elastic deformation) of the outer wall under pressure acting from the inside during the dispensing process. In this case, an external support structure of the type mentioned at the outset for the dispensing process can be dispensed with.

Some possible embodiments and designs that can lead to these purposes are specified below.

According to one embodiment, the plurality of rings or spiral turns are evenly distributed over an entire axial length of the outer wall. As a result, the reinforcement can absorb tensile stresses acting in the peripheral direction evenly over the entire length of the cartridge and over the entire duration of the dispensing process in order to prevent deformation of the cartridge.

According to one embodiment, the reinforcement has a woven fabric made of the mentioned material that is stable against tensile stresses. The plurality of rings or spiral turns, which extend mainly in the peripheral direction of the outer wall, form part of the woven fabric structure. In addition, the woven fabric comprises further strands, threads or strips of material that extend transversely thereto (for example mainly in the axial direction of the cartridge) and can be interwoven with the rings or spiral turns in any desired manner. In this way, the overall stabilizing effect of the reinforcement can be increased and additionally achieved in the axial direction.

According to one embodiment, at least the outer wall of the cartridge is produced by injection molding (e.g. from plastics material) or by another casting process (e.g. from metal). In this embodiment, the reinforcement can be embedded inside the outer wall by being cast or injected therein. In particular, the reinforcement can include rings that are closed in the peripheral direction of the cartridge or spiral turns that merge into one another without interruption, in order to prevent a radial expansion of the outer wall over its entire periphery in a particularly uniform and reliable manner.

As an alternative to this, the reinforcement can also be fastened to an outer or inner surface of the outer wall. The cartridge can also subsequently be equipped with the reinforcement, for example after it has been produced using a conventional and/or particularly favorable or simple production method.

According to one embodiment, the reinforcement can be embedded, for example, in a layer or film (made of plastics material or metal, for example), which is applied, for example glued, to the inside or outside of the outer wall of the cartridge. In principle, there are no limiting requirements for the thickness of the mentioned layer or film, except that it must be sufficient to hold the reinforcement together and to fasten it to the outer wall of the cartridge. For example, it can also be useful to choose the thickness of the layer/film such that it can be flexibly placed around the outer wall when it is fastened thereto without breaking or having to be deformed with force so as not to damage the structure of the reinforcement formed therein.

The mentioned layer or film is fastened to the cartridge with an overlap in the peripheral direction, such that the plurality of rings of the reinforcement also overlap in the peripheral direction by extending in the peripheral direction into overlapping portions of the mentioned layer/film that are fastened to one another, and thereby have overlapping ends. As a result, a radial expansion of the outer wall can be prevented uniformly and reliably over its entire periphery.

In a specific design, the mentioned layer or film is glued to the outside of the outer wall of the cartridge and is designed as a label which, in addition to the reinforcement, bears predetermined identification elements (such as barcodes, chips, etc.) for identifying or labeling the cartridge. In other words, the reinforcement can be integrated into a sales label that has to be applied to the cartridge anyway.

In all possible embodiments and designs of the cartridge, the mentioned material of the rings or the spiral turns can be or comprise aramid, glass fiber or carbon fiber. Alternatively or additionally, any other material that is stable against tensile stresses, such as natural or plastics fibers, metal wire and much more in the form of individual fibers, threads, strands, strips or fabric structures can be used, the strength and stability of which are to be chosen appropriately for reinforcing the outer wall in order to protect it against elastic expansion during the dispensing process. The wall thicknesses of the inner wall and the outer wall, depending on specific conditions such as material, pressurization, overall size of the cartridge, etc., are also to be selected so as to be suitable for the functionality described herein.

The inner wall and the outer wall of the cartridge can each have a circular cross section. However, this is not absolutely necessary for the functional principle presented herein, and therefore in principle other cross-sectional shapes, such as elliptical or rectangular shapes, are just as possible. At least the inner wall and/or the outer wall of the cartridge can be made of plastics material. In particular, the entire cartridge can be made of plastics material, and its individual components can be made of the same or different types of plastics material. In principle, however, other materials, such as metal, can also be used.

In particular, the cartridge front wall can have a connecting piece on its side facing away from the inner and the outer chamber, into which piece the discharge openings of the inner and the outer chamber open and which is designed for connecting a mixer for mixing the various components of the multi-component composition during the dispensing process.

According to a further aspect, a system for storing and discharging a flowable multi-component composition is provided. The system comprises a coaxial cartridge of the type presented herein and a support structure having a receptacle which is at least partially cylindrical on the inside, the shape and size of which receptacle is dimensioned for inserting and holding the cartridge in order to dispense the multi-component composition therefrom.

An intermediate space in the form of a substantially cylindrical annular gap remains between the inside of the receptacle of the support structure and the outer wall of the cartridge inserted therein, which space simplifies the insertion of the cartridge into the support structure before the dispensing process. In other words, an inner diameter of the cylindrical receptacle of the support structure is larger than an outer diameter of the outer wall of the cartridge by a predetermined annular gap which is twice as wide. The mentioned annular gap width is ideally just large enough to allow the cartridge to be inserted smoothly into the receptacle of the support structure.

In contrast to conventional coaxial cartridges having an elastically deformable outer wall, this annular gap in the present system does not promote any disruptive restoring or pumping behavior of the cartridge during the dispensing process, because the reinforcement integrated in the cartridge significantly reduces or even completely prevents elastic expansion of its outer wall.

In particular, the system can also comprise the mixer mentioned above, which is designed to be connected to the connecting piece of the cartridge front wall and to mix the various components of the multi-component composition during the dispensing process. During the dispensing process, the first component from the inner chamber and the second component from the outer chamber are pressed outward through the discharging openings toward the cartridge front wall by the simultaneous axial movement of the inner and the outer piston.

BRIEF DESCRIPTION OF THE DRAWINGS

The above aspects of the invention and the embodiments and specific designs thereof are explained in more detail below with reference to the examples shown in the accompanying drawings. The drawings are schematic. Said drawings may, but do not have to, be understood to be true to scale. In the drawings:

FIG. 1 shows, in an axial longitudinal section, an example of a system 1 of the type presented herein, in which a coaxial cartridge 2 is inserted into a hollow-cylindrical receptacle 13 of a support structure 3 in order to dispense the multi-component composition contained therein. In this example, the coaxial cartridge 2 is made of plastics material. The same can also apply to the support structure 3.

Figure 1:
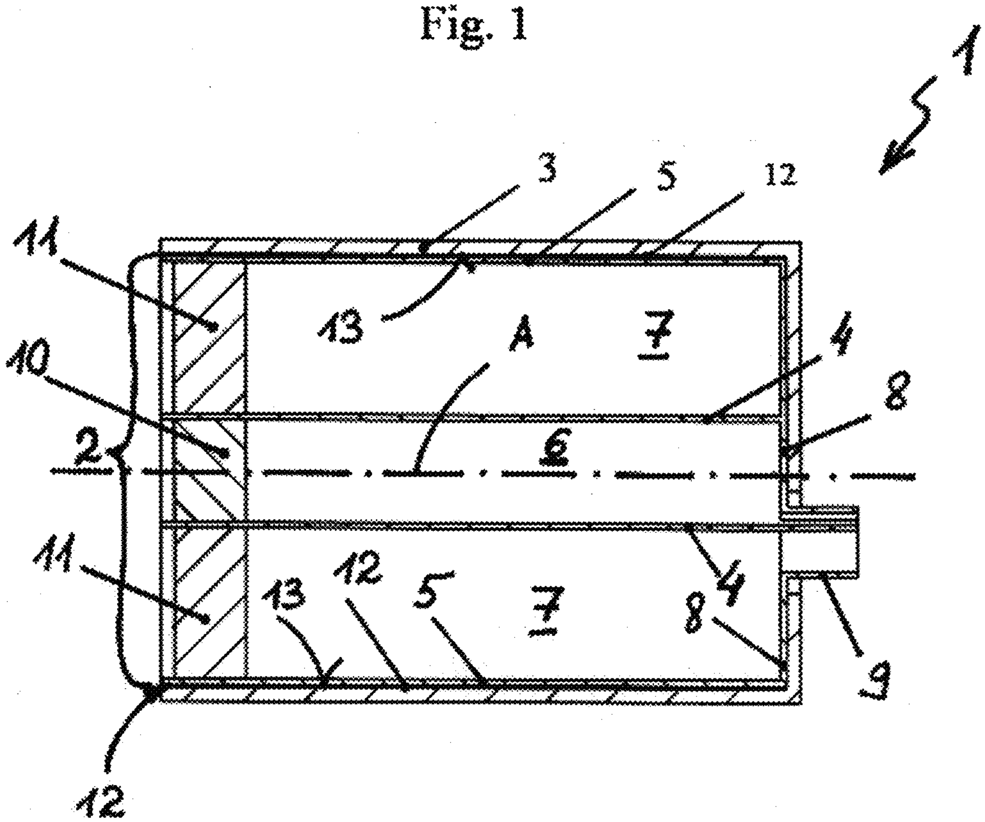
FIG. 1 is a longitudinal section of a system of the type presented herein with a coaxial cartridge inserted in a support structure with a cylindrical annular gap therebetween.

The cartridge 2 comprises a hollow-cylindrical inner wall 4 and a hollow-cylindrical outer wall 5 having a common cylinder axis A, which outer wall is arranged around said inner wall, whereby an inner chamber 6, which is delimited radially by the inner wall 4, and an outer chamber 7, which is arranged radially between the inner wall 4 and the outer wall 5, are formed. A first component of the multi-component composition to be discharged is accommodated in the inner chamber 6, while a second component of the multi-component composition is accommodated in the outer chamber 7 (not shown).

On one end face of the cartridge 2, which is on the right in FIG. 1, the cartridge front wall 8 closes the inner chamber 6 and the outer chamber 7, one discharge opening per chamber being formed in the cartridge front wall 8. The two discharge openings open into a connecting piece 9 which is formed in the cartridge front wall 8 on its side facing away from the inner and the outer chamber 6, 7 and for connecting (e.g. by screwing onto an external thread indicated in FIGS. 2 and 3) a mixer, not shown separately, for mixing the first and the second component of the multi-component composition during the dispensing process.

Furthermore, the cartridge 2 comprises an inner piston 10 which closes the inner chamber 6 at the rear and is axially movable therein, and an outer piston 11 which closes the outer chamber 7 at the rear and is axially movable therein, it being possible for the multi-component composition to be discharged from the cartridge 2 through the dispensing openings in the cartridge front wall 8 (dispensing process) by means of the simultaneous axial movement of said pistons to the right in FIG. 1.

The diameter of the coaxial cartridge 2 is slightly smaller than the support structure 3, such that a cylindrical annular gap 12 remains between the outer wall 5 of the cartridge and the cylindrical receptacle 13 of the support structure 3, which annular gap facilitates the insertion of the cartridge 2 into the receptacle 13. The cartridge 2 has a reinforcement 14 integrated in/on its outer wall 5 (only shown in FIGS. 2 and 3), which reinforcement reduces or completely prevents an elastic expansion of the outer wall 5 into the annular gap 12 during the dispensing process, whereby the disturbing elastic restoring behavior (pumping) of the cartridge 2 can be reduced or even entirely prevented.

Figure 2:
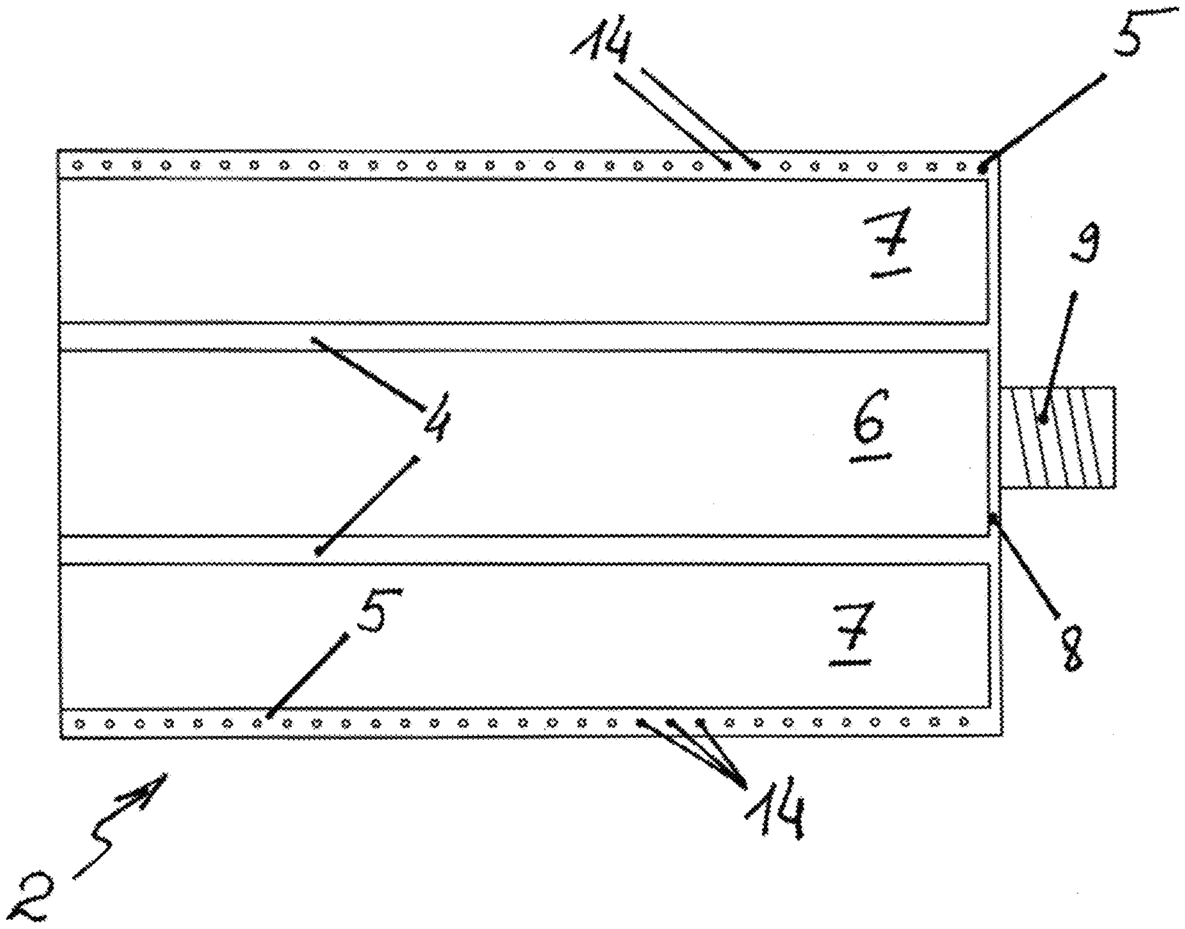
FIG. 2 is a longitudinal section of a coaxial cartridge of the type presented herein with an embedded reinforcement in its outer wall.
Figure 3:
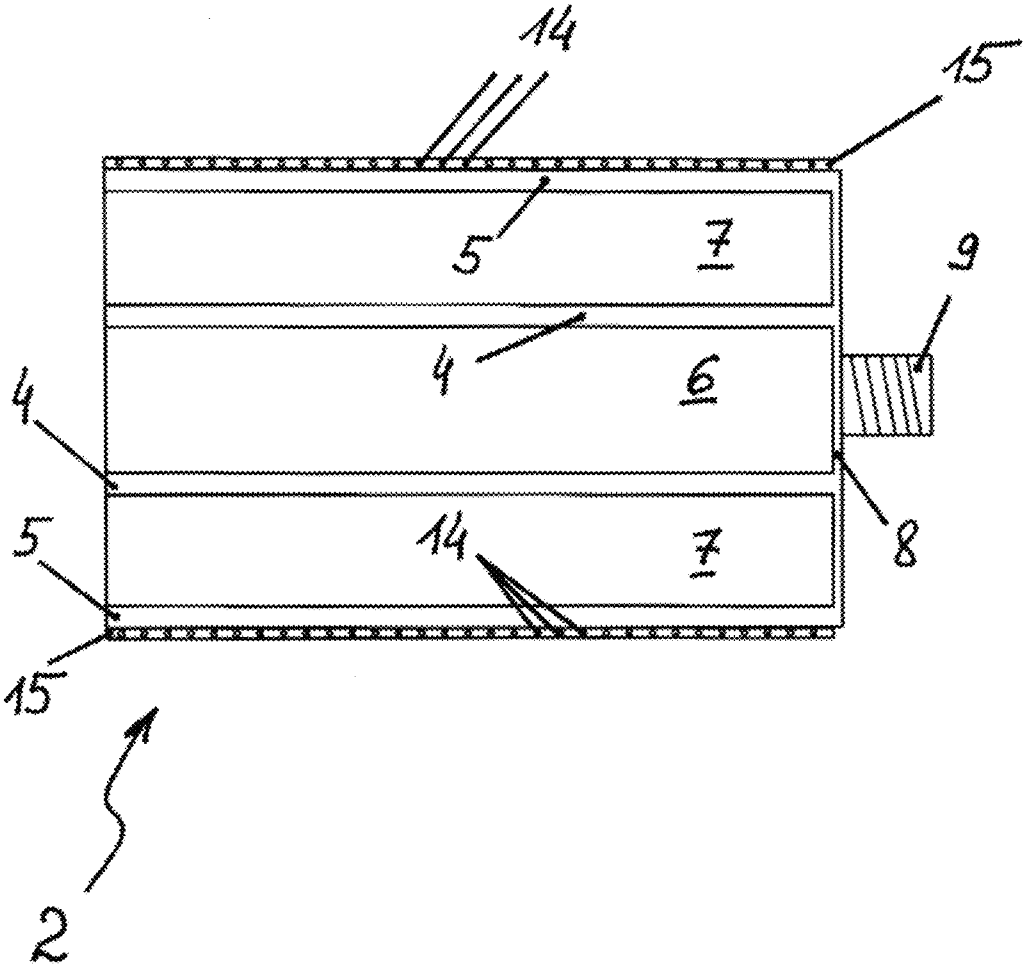
FIG. 3 is a longitudinal section of a coaxial cartridge of the type presented herein with a reinforcement that is integrated in a sales label glued to the outer wall.

FIGS. 2 and 3 show, each in a highly simplified schematic representation, two embodiments of a coaxial cartridge 2 of the type presented herein, which differ in the design of the integrated reinforcement 14. Moreover, reference is made to the above general description of the cartridge 2 in FIG. 1. The cartridge 2 of FIGS. 2 and 3 can in particular be part of the system 1 of FIG. 1, the axial longitudinal section shown in FIGS. 2 and 3 being rotated by 90° about the cylinder axis A with respect to FIG. 1, such that the position of the connecting piece 9, which position is clearly visible in FIG. 1 from the middle of the cartridge front wall 8, is not visible in FIGS. 2 and 3.

FIG. 2 shows a reinforcement 14 cast into the cartridge outer wall 5 which can absorb tensile loads in the peripheral direction of the cartridge 2 and thus prevents the outer wall 5 from expanding and increasing in diameter during a dispensing process. The reinforcement 14 can be designed, for example, as a plurality of rings that are closed in the peripheral direction or as a spiral or as a woven fabric structure and can be made of various materials suitable for the stated purpose (aramid, glass fiber, carbon fiber, etc.).

In order to avoid a more cost-intensive production of such cartridges 2, which are reinforced by means of an injected woven fabric or injected rings or spiral turns, the reinforcement 14 can also be subsequently applied to the cartridge 2. For this purpose, FIG. 3 shows a possibility of integrating the reinforcement 14 into a sales label 15 that is to be applied anyway. The label 15 is to be overlappingly applied at its ends in the peripheral direction of the cartridge 2, for example by being glued on. The adhesive effect of the label 15 in the overlapping region (not shown separately), together with the corresponding overlapping rings or woven fabric structures of the reinforcement 14, causes a reliable reinforcement of the cartridge outer wall 5 in its peripheral direction, thus preventing its expansion and thus preventing unfavorable pumping with associated mixing problems. Moreover, the same can apply to FIG. 3 as explained above in relation to FIGS. 1 and 2.

By means of an integrated reinforcement 14, it is possible both in FIG. 2 and in FIG. 3 to stabilize the cartridge 2 sufficiently for pressurization that can occur during a dispensing process, such that there is no elastic or plastic expansion or other deformation of the outer wall 5. In this case, a support structure 3 of FIG. 1 comprising the cartridge 2 can therefore be dispensed with entirely for a dispensing process.

The invention claimed is:

1. A coaxial cartridge designed to store and discharge a flowable multi-component composition, comprising:
- a hollow-cylindrical inner wall and a hollow-cylindrical outer wall arranged coaxially around said inner wall,
- an inner chamber, which is delimited radially by the inner wall, for receiving a first component of the multi-component composition;
- an outer chamber, which is arranged radially between the inner wall and the outer wall, for receiving a second component of the multi-component composition;
- a cartridge front wall, which firmly closes the inner chamber and the outer chamber on one end face of the coaxial cartridge and has one discharge opening per chamber;
- an inner piston, which closes the inner chamber at a rear and is axially movable therein, and an outer piston which closes the outer chamber at a rear and is axially movable therein; and
- an integrated reinforcement, fastened to a surface of the outer wall, and having
  - a plurality of rings that are overlapping or closed in a peripheral direction of the outer wall,
- wherein the plurality of rings are made of a material that is stable against tensile stresses, and
- wherein the integrated reinforcement is glued or otherwise fastened, other than by embedding, into the outer wall, to a surface of the outer wall of the coaxial cartridge.

2. The coaxial cartridge according to claim 1, wherein the material of the plurality of rings and a number and distribution thereof along the outer wall are such that, when the multi-component composition is dispensed from the coaxial cartridge by axial displacement of the inner piston and of the outer piston, a shape and dimensions of the outer wall remain unchanged.

3. The coaxial cartridge according to claim 1, wherein the plurality of rings are distributed substantially evenly over an entire axial length of the outer wall.

4. The coaxial cartridge according to claim 1, wherein the integrated reinforcement comprises a woven fabric made of the material that is stable against tensile stresses, and wherein the plurality of rings are a component of the woven fabric.

5. The coaxial cartridge according to claim 1, wherein the integrated reinforcement is formed in a layer or film which is fastened to an inside or outside of the outer wall of the coaxial cartridge, with an overlap in the peripheral direction; and
- wherein the plurality of rings each overlap in the peripheral direction by extending in the peripheral direction into overlapping portions of the layer or film that are fastened to one another, and thereby have overlapping ends.

6. The coaxial cartridge according to claim 1, wherein the material of the plurality of rings is or comprises aramid, glass fiber or carbon fiber.

7. A system for storing and discharging a flowable multi-component composition, comprising:
- the coaxial cartridge according to claim 1; and
- a support structure having a receptacle which is at least partially cylindrical on an inside, wherein a shape and size of the receptacle is dimensioned for inserting and holding the coaxial cartridge in order to dispense the multi-component composition therefrom,
- wherein an inner diameter of the receptacle of the support structure is greater than an outer diameter of the coaxial cartridge by a predetermined annular gap which is twice as wide.

8. The system according to claim 7, wherein the annular gap is wide enough to allow the coaxial cartridge to be inserted smoothly into the receptacle of the support structure.

9. The coaxial cartridge according to claim 1, comprising the plurality of rings that are overlapping.

10. The coaxial cartridge according to claim 1, comprising the plurality of rings that are closed.

11. The coaxial cartridge according to claim 1, including the flowable multi-component composition.

12. The coaxial cartridge according to claim 1, wherein the integrated reinforcement is formed in a layer or film.

13. The coaxial cartridge according to claim 1, wherein the integrated reinforcement is glued to a surface of the outer wall of the coaxial cartridge.

14. A coaxial cartridge, designed to store and discharge a flowable multi-component composition, comprising:
- a hollow-cylindrical inner wall and a hollow-cylindrical outer wall arranged coaxially around said inner wall,
- an inner chamber, which is delimited radially by the inner wall, for receiving a first component of the multi-component composition;
- an outer chamber, which is arranged radially between the inner wall and the outer wall, for receiving a second component of the multi-component composition;
- a cartridge front wall, which firmly closes the inner chamber and the outer chamber on one end face of the coaxial cartridge and has one discharge opening per chamber;
- an inner piston, which closes the inner chamber at a rear and is axially movable therein, and an outer piston which closes the outer chamber at a rear and is axially movable therein; and
- an integrated reinforcement, embedded inside the outer wall or fastened to a surface of the outer wall, and having a plurality of rings that are overlapping or closed in a peripheral direction of the outer wall, or a plurality of spiral turns, and
- wherein the plurality of rings or the plurality of spiral turns are made of a material that is stable against tensile stresses, wherein the integrated reinforcement is formed in a layer or film which is fastened to an inside or outside of the outer wall of the coaxial cartridge, with an overlap in the peripheral direction; and wherein the plurality of rings, if present, each overlap in the peripheral direction by extending in the peripheral direction into overlapping portions of the layer or film that are fastened to one another, and thereby have overlapping ends, wherein the layer or film is glued to the outside of the outer wall of the coaxial cartridge and is designed as a label which, in addition to the integrated reinforcement, comprise predetermined identification elements for identifying or labeling the coaxial cartridge.

15. The coaxial cartridge according to claim 14, wherein at least the outer wall of the coaxial cartridge is produced by injection molding or another casting process; and wherein the integrated reinforcement is embedded inside the outer wall by being cast therein.

16. The coaxial cartridge according to claim 15, wherein the integrated reinforcement has the plurality of rings that are closed in the peripheral direction of the outer wall, or wherein the integrated reinforcement has the plurality of spiral turns merging into one another without interruption.

17. The coaxial cartridge according to claim 16, wherein the integrated reinforcement has the plurality of rings that are closed in the peripheral direction of the outer wall.

18. The coaxial cartridge according to claim 16, wherein the integrated reinforcement has the plurality of spiral turns merging into one another without interruption.

19. The coaxial cartridge according to claim 14, comprising the plurality of spiral turns.

20. The coaxial cartridge according to claim 14, wherein the integrated reinforcement is embedded inside the outer wall.

21. The coaxial cartridge according to claim 14, wherein the integrated reinforcement is fastened to a surface of the outer wall.

22. The coaxial cartridge according to claim 14, wherein the plurality of rings, are present.

* * * * *